(12) United States Patent
Serreze

(10) Patent No.: US 8,052,291 B2
(45) Date of Patent: Nov. 8, 2011

(54) SOLAR SIMULATOR FILTER

(75) Inventor: Harvey B. Serreze, Pepperell, MA (US)

(73) Assignee: Spire Corporation, Bedford, MA (US)

( * ) Notice: Subject to any disclaimer, the term of this patent is extended or adjusted under 35 U.S.C. 154(b) by 464 days.

(21) Appl. No.: 12/378,614

(22) Filed: Feb. 18, 2009

(65) Prior Publication Data

US 2010/0208448 A1      Aug. 19, 2010

(51) Int. Cl.
*F21V 9/02* (2006.01)
(52) U.S. Cl. ............................. 362/2; 362/1
(58) Field of Classification Search .............. 362/1, 2
See application file for complete search history.

(56) References Cited

U.S. PATENT DOCUMENTS

| 3,517,201 A | 6/1970 | Gilford et al. | |
|---|---|---|---|
| 4,125,775 A * | 11/1978 | Chodak | 362/1 |
| 4,641,227 A | 2/1987 | Kusuhara | |
| 5,623,149 A | 4/1997 | Kilmer | |
| 6,548,819 B1 | 4/2003 | Lovelady | |
| 6,975,663 B2 | 12/2005 | Sekiya et al. | |
| 2002/0122305 A1 * | 9/2002 | Adelhelm | 362/2 |

OTHER PUBLICATIONS

Written Opinion of the International Searching Authority for PCT Application No. PCT/US10/00388 mailed Apr. 9, 2010 (seven (7) pages).

* cited by examiner

*Primary Examiner* — David V Bruce
(74) *Attorney, Agent, or Firm* — Iandiorio Teska & Coleman

(57) ABSTRACT

A solar simulator filter includes filter material configured to achieve class A performance for the spectral output of the optical source except between about 900 and 1,100 nm. Openings in the filter material increase the average effective transmittance between about 900 and 1,100 nm to achieve class A performance for the spectral output of the source.

14 Claims, 8 Drawing Sheets

SOLAR SIMULATOR FILTER

FIELD OF THE INVENTION

The subject invention relates to photovoltaics and, more particularly, solar simulators.

BACKGROUND OF THE INVENTION

Solar simulators are used for testing photovoltaic modules. One requirement of a solar simulator is that it must produce an optical output spectrum that closely matches that of natural sunlight. Standards defining an acceptable spectral output for solar simulators have been developed by both ASTM International and the IEC. Such standards specify the fractions of total optical power in each of 6 100 nm or 200 nm wide wavelength intervals (or bins) from 400 to 1,100 nm. To achieve class A spectral performance, the output of the simulator must be within +/−25% of the mean values specified in the standard.

The most commonly used light source in pulsed solar simulators is a low pressure Xe arc lamp. Although such a lamp possesses adequate short wavelength output (less than 500 nm), it emits excessive near-infrared (greater than 700 nm) radiation.

To compensate for this excess radiation, optical filters (often arranged in an array configuration with large-area simulators) can be used to attenuate the output in the near infrared. The two most important features of the filter design are its cutoff wavelength (the wavelength at which the transmittance equals 50%) and the average transmittance in the long wavelength region (900 to 1,100 nm). The cutoff wavelength primarily affects the simulator output in the 700 to 800 and 800 to 900 nm bins, while the long wavelength transmittance mostly affects the output in the 900 to 1,100 nm bin.

It can be very difficult to control these two filter parameters independently. Typical filters are typically made using a multitude of dielectric layers each of a thickness less than the optical wavelength. Design changes made to affect the cutoff characteristics may not yield the most desirable long wavelength properties. Conversely, tailoring the long wavelength properties may adversely affect the cutoff characteristics and, in some cases, even reduce the transmittance at the shortest wavelength region (less than 450 nm) which needs to remain high to give adequate near ultraviolet (400 to 500 nm) output. The difficulty of controlling these filter characteristics is manifested in an output spectrum resulting from such prior art filters which are not class A by virtue of a slightly too high output in the 800 to 900 rim and 900 to 1,100 nm bins.

BRIEF SUMMARY OF THE INVENTION

It is therefore an object of the subject invention to provide a new solar simulator filter.

It is a further object of the subject invention to provide such a filter which achieves class A spectral performance.

It is still a further object of the subject invention to provide such a filter which is fairly simple in design and can be manufactured at a low cost.

The subject invention results from the realization, in part, that a hot mirror filter typically used to block infrared radiation in devices such as digital cameras can be used as a solar simulator filter except that such a filter produces insufficient output for wavelengths between 900 and 1,100 nm and yet, if small areas of the dielectric material layer stack of such a hot mirror filter are etched away or otherwise removed, the average effective transmittance between 900 and 1,100 nm can be sufficiently increased to achieve class A performance.

The subject invention features a solar simulator filter for an optical light source. One filter includes filter material configured to achieve class A performance for the spectral output of the source except between about 900 to 1,100 nm. But, openings in the filter material increase the average effective transmittance between about 900 to 1,100 nm to achieve class A performance for the spectral output of the source.

In one example, the source is a Xe arc lamp. The filter material, in one preferred embodiment, is a hot mirror filter. The openings can be formed through the optically active layers of the hot mirror filter. Alternatively, the openings can be gaps between a plurality of hot mirror filter pieces. Typically, the ratio of the total area of the openings and the filter material is approximately 1%.

The subject invention also features a solar simulator filter for a source comprising means for achieving class A performance for the spectral output of the source except between about 900 and 1,100 nm and means for increasing the average effective transmittance between about 900 and 1,100 nm. In one preferred embodiment, the means for achieving includes a hot mirror filter and the means for increasing includes openings in the hot mirror filter material.

A solar simulator in accordance with the subject invention includes a Xe arc lamp, hot mirror filter material configured to achieve class A performance for the spectral output of the Xe arc lamp except for between about 900 and 1,100 nm, and openings which increase the average effectiveness of transmittance between about 900 and 1,100 nm to achieve class A performance for the spectral output of the Xe arc lamp.

One solar simulator filter in accordance with the subject invention includes filter material configured to achieve a specified performance for the spectral output of the source except between certain predetermined wavelengths and openings which increase the average effective transmittance between said certain predefined wavelengths to achieve the desired performance requirements for the spectral output of the source. In one example, the spectral performance is class A and the predetermined wavelengths are between about 900 and 1,100 nm.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
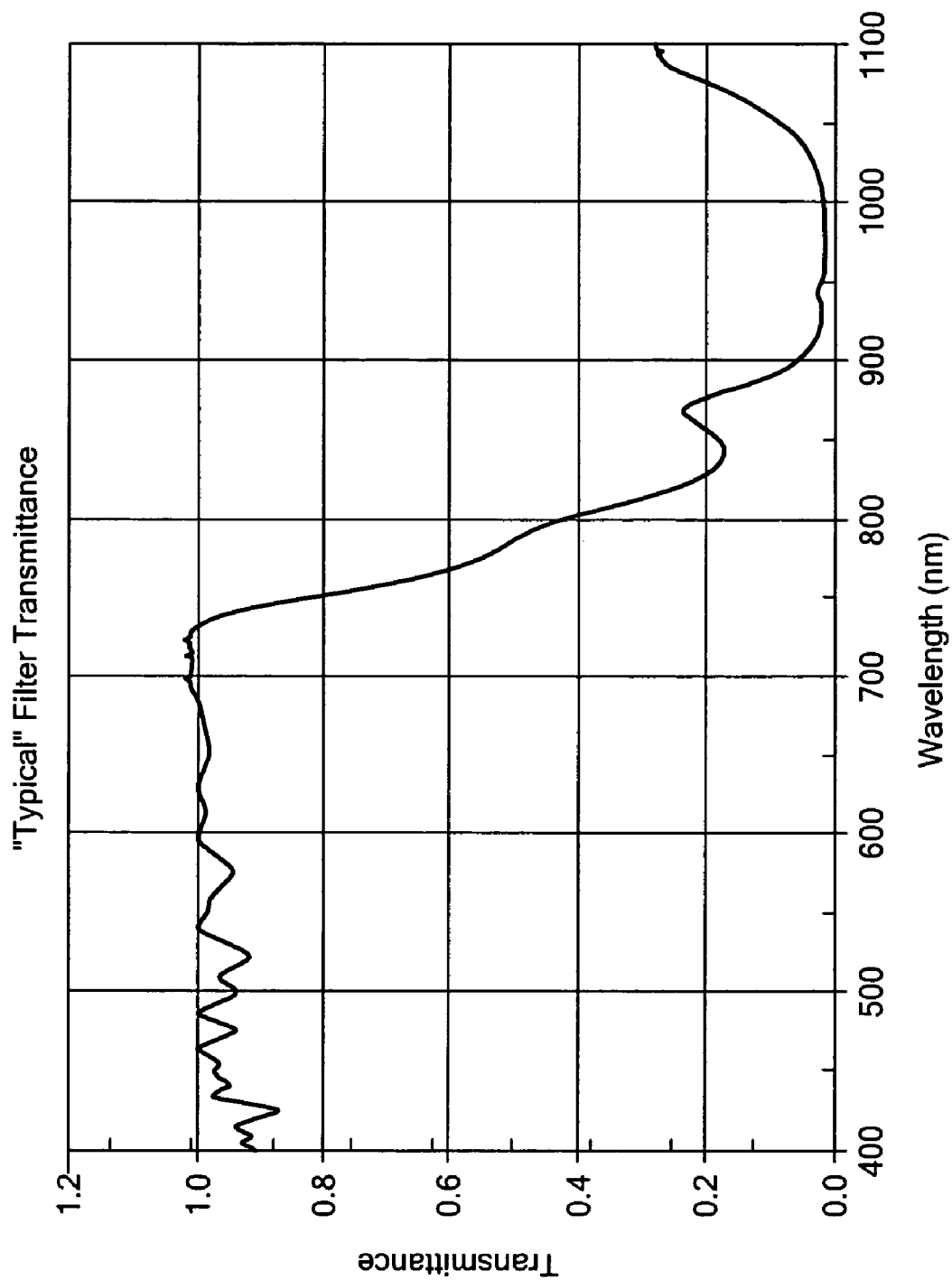
FIG. 1 is a graph showing the transmittance versus wavelength for a typical prior art solar simulator filter.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
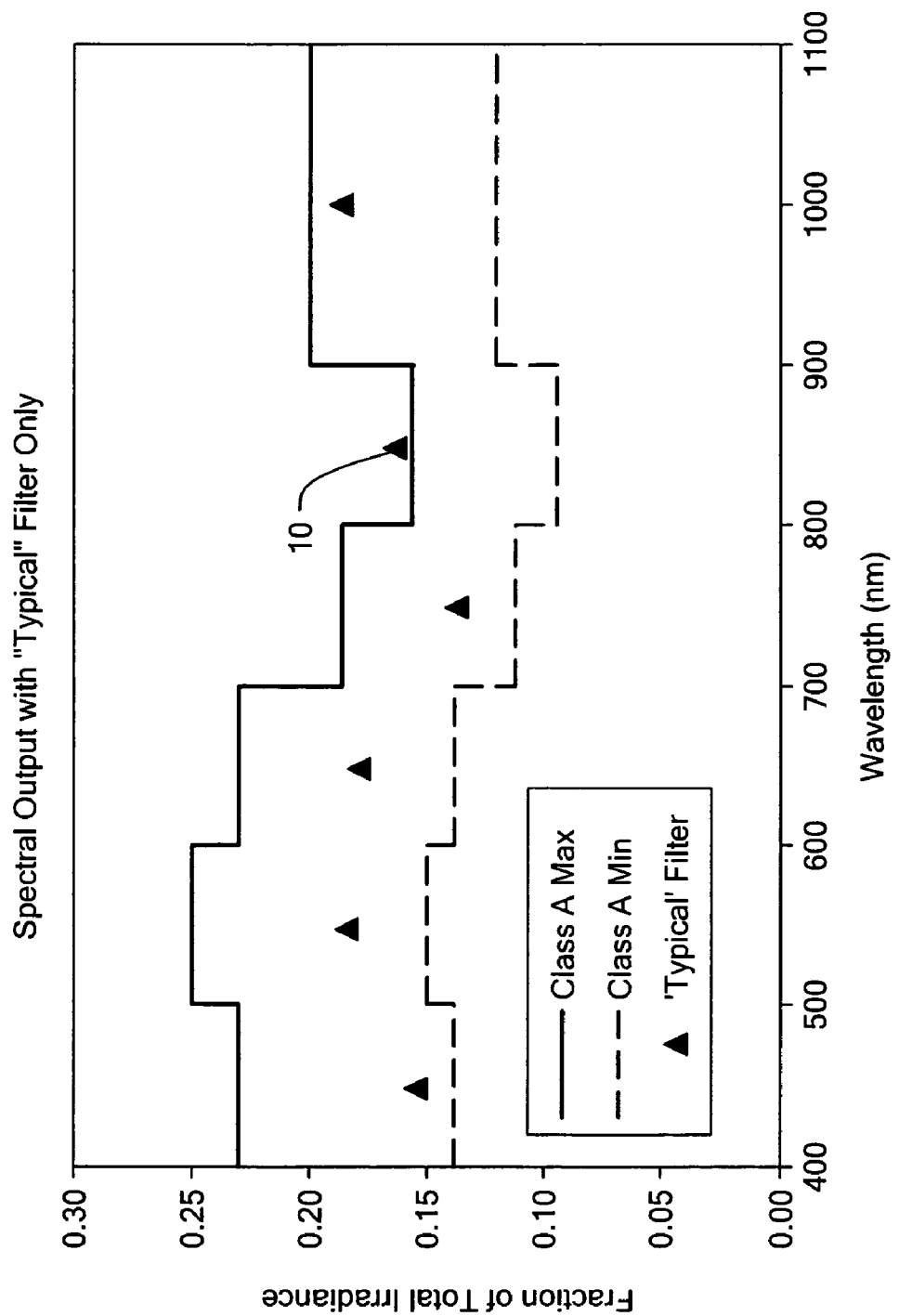
FIG. 2 is a graph showing the fraction of total irradiance versus wavelength for the typical prior art solar simulator filter having the transmittance characteristics shown in FIG. 1.

As discussed in the background section above, prior solar simulator filters exhibit the transmittance characteristic shown in FIG. 1 and resulted in too high of an output for wavelengths between 800 and 900 nm as shown at 10 in FIG. 2. Such simulators often do not meet the requirements of class A performance.

Figure 3:
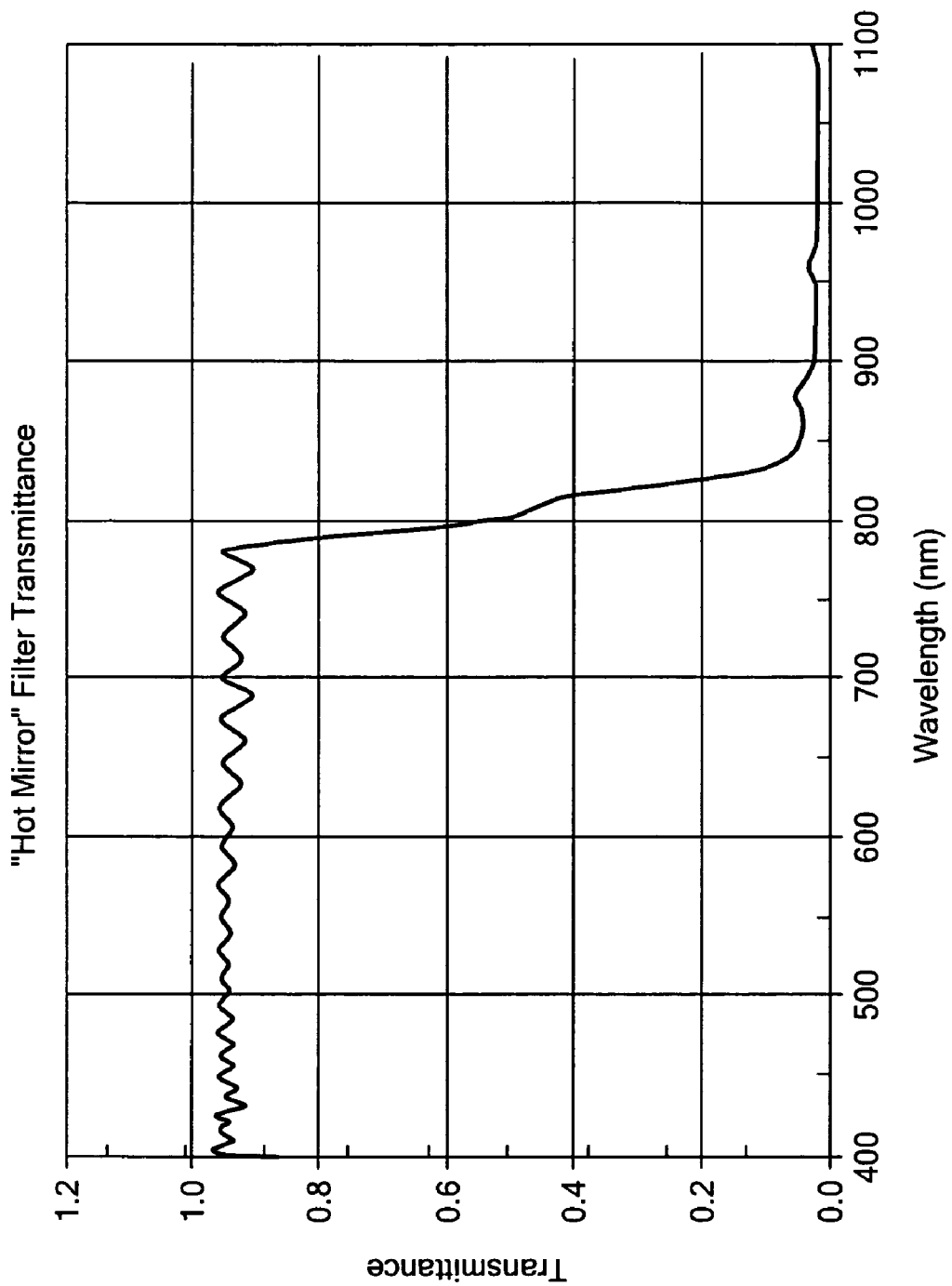
FIG. 3 is a graph showing transmittance versus wavelength for a hot mirror filter used in one preferred embodiment of the subject invention.
Figure 4:
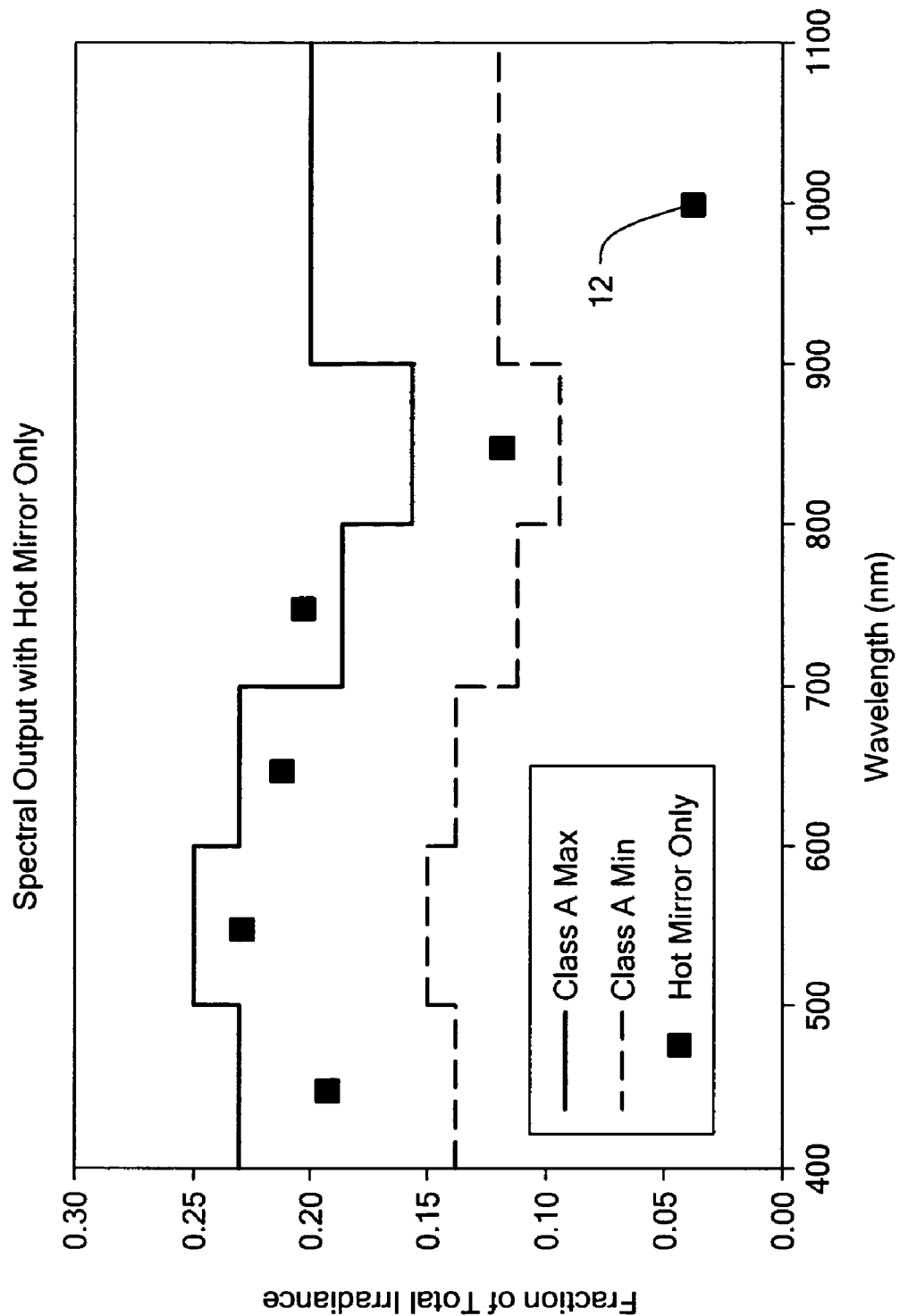
FIG. 4 is a graph showing the fraction of total irradiance versus wavelength for the hot mirror filter having the transmittance characteristics of FIG. 3.

In the subject invention, means are provided for achieving class A performance for the spectral output of a source which is not class A between about 900 and 1,100 nm. In one preferred embodiment, a hot mirror filter is used having the transmittance characteristics shown in FIG. 3. Note, however, that there is insufficient output for wavelengths between 900 and 1,100 nm as shown at 12 in FIG. 4 to meet class A performance requirements.

Figure 5:
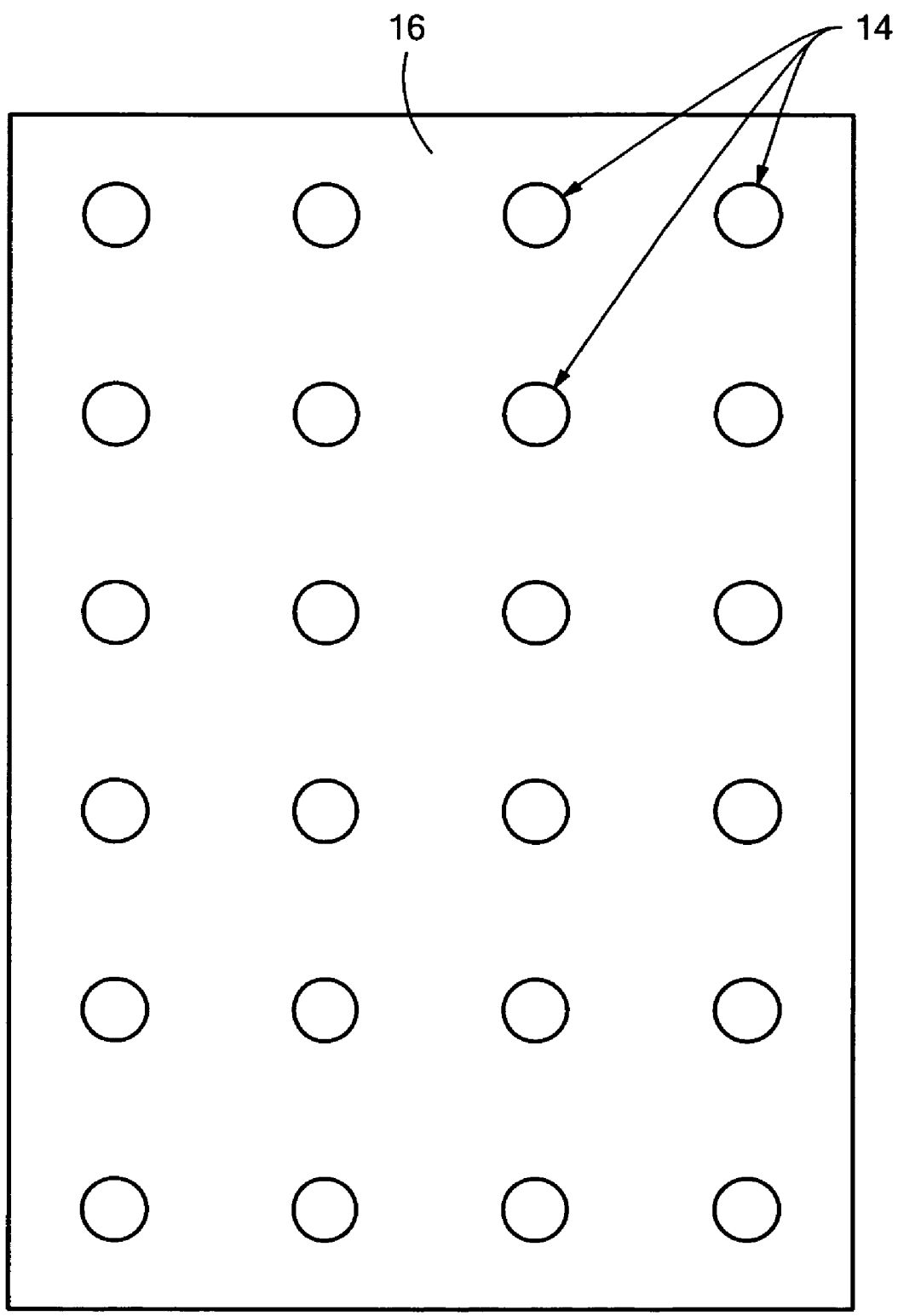
FIG. 5 is a schematic front view of an example of a novel solar simulator filter in accordance with the subject invention.

Thus, in accordance with the subject invention, there are means for increasing the average effective transmittance in this wavelength interval. In one particular preferred embodiment, holes 14, FIG. 5 are etched in the dielectric layers of hot mirror filter 16 to increase the average effective transmittance between about 900 and 1,100 nm to achieve class A performance of the simulator 30 or 30', FIGS. 6A-6B.

The hot mirror filters typically include a stack of layers of alternating dielectric material (such as but not limited to $SiO_2$, $TiO_2$, $Ta_2O_5$, etc.) deposited upon a transparent substrate such as glass. Each layer is typically less than one optical wavelength in thickness and the total number of layers is generally between 10 and 50. Holes may be formed in the dielectric layer stack (the optically active layers) to reveal regions that are dielectric free. The glass substrate is typically still present. These holes can be formed by spatially-selective chemical or other etching, or can be made during the dielectric deposition process itself using suitable masking.

Figure 6A:
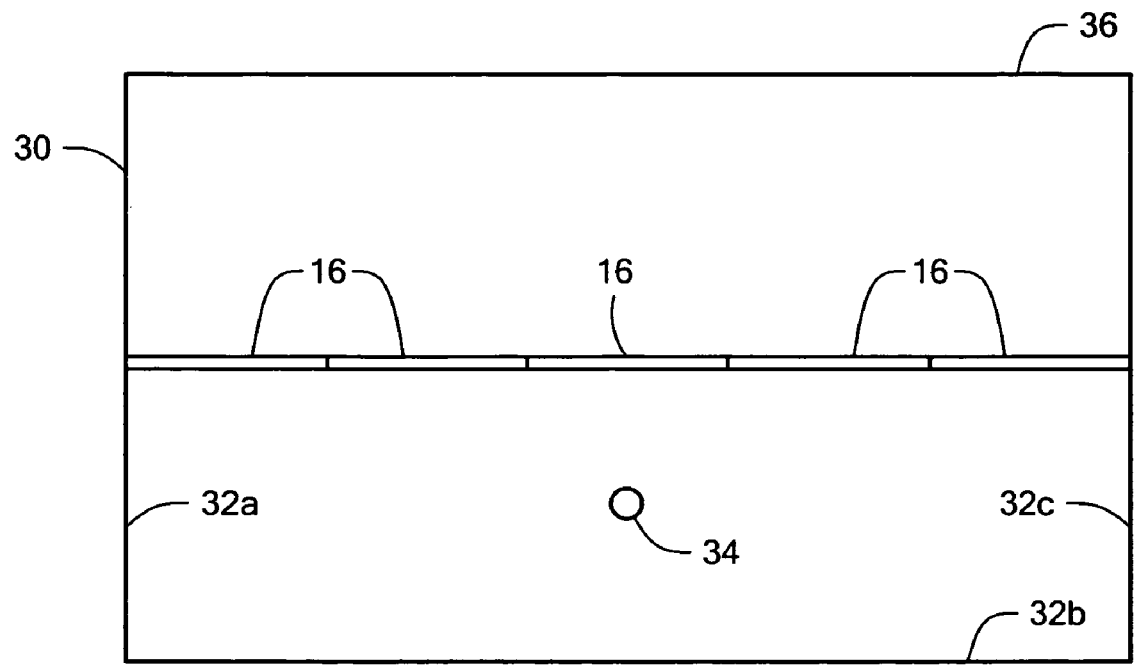
FIGS. 6A-6B are highly schematic three-dimensional end views of the solar simulator filter of FIG. 5 used in connection with a source of radiation.
Figure 6B:
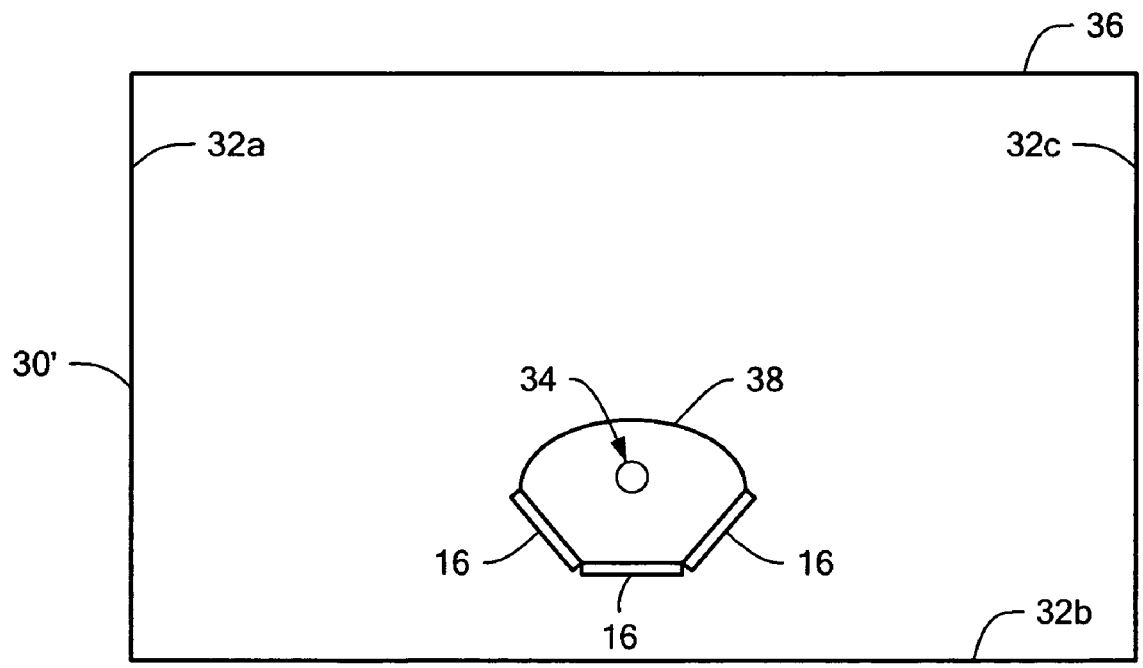

In FIG. 6A, the simulator chamber is 30 and includes diffuse reflective surfaces 32a, 32b, and 32c about Xe lamp 34. Filters 16 are in the optical path between lamp 34 and transparent output surface 36. In FIG. 6B, filters 16 are disposed about source 34. The surfaces of simulator 30' are made of diffuse reflective material and thus radiation from source 34 passes through filters 16 and out through transparent surface 36. Opaque cover 38 which may be reflective on the inside and even the outside is also used.

Figure 7:
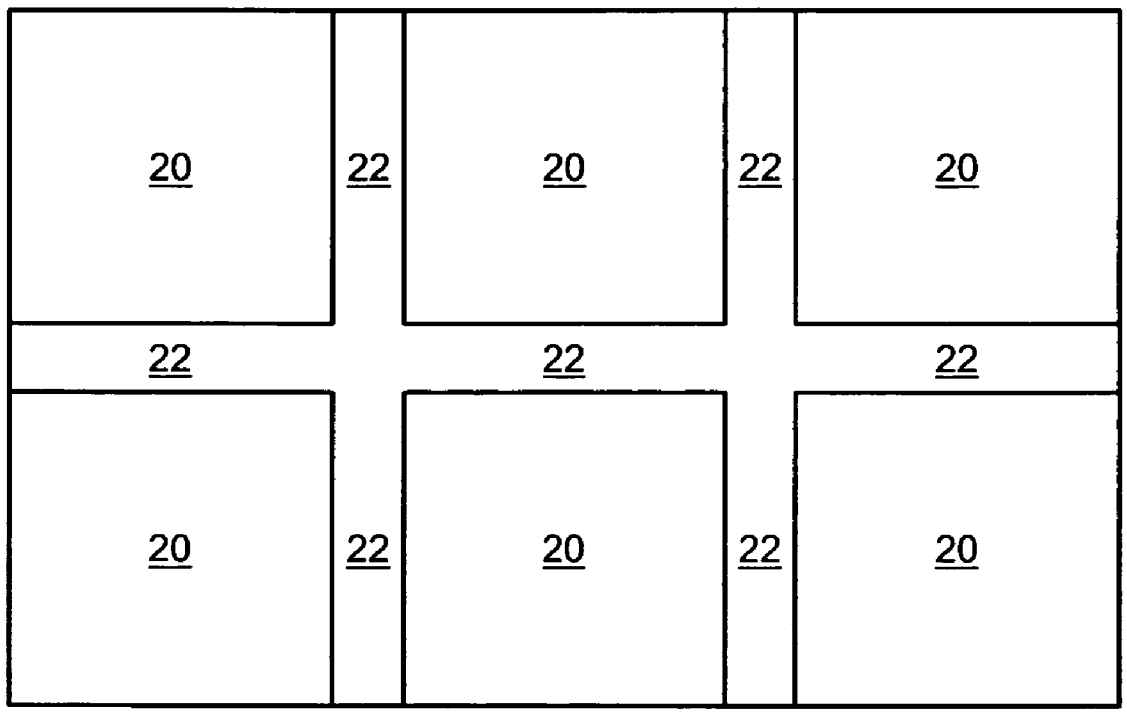
FIG. 7 is a schematic front view showing another example of a novel solar simulator filter in accordance with the subject invention.

In another example, hot mirror filter pieces 20, FIG. 7 are separated by small gaps 22 to increase the average effective transmittance of the filter material pieces. The preferred ratio of the openings, whether they are holes or gaps, and the filter material present is approximately 1%.

Figure 8:
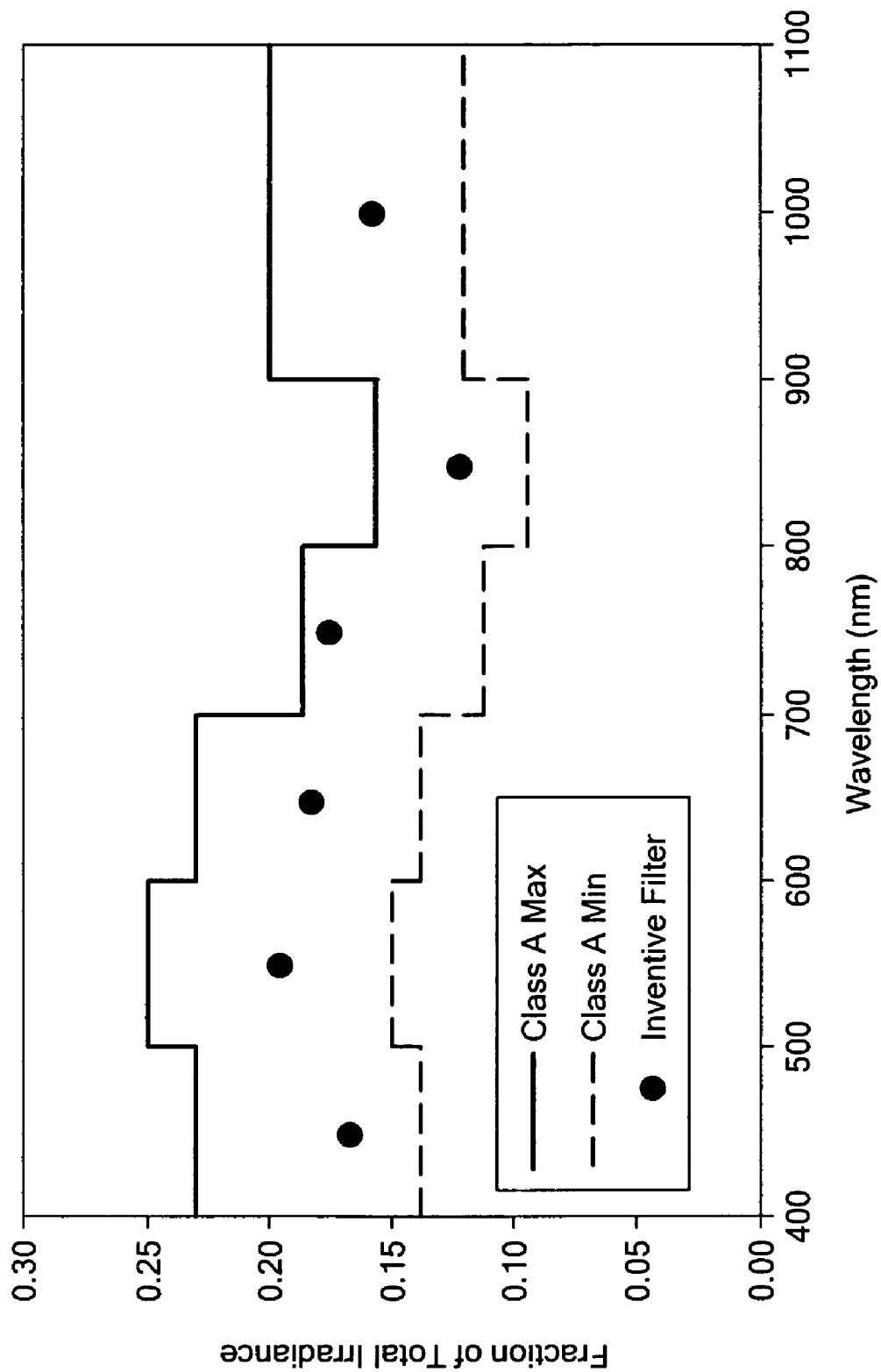
FIG. 8 is a graph of the fraction of total irradiance versus wavelength for the new solar simulator filters of FIGS. 5-7.

FIG. 8 shows how the configuration of FIGS. 6 and 7 achieve class A performance as defined by ASTM International and the IEC. The holes or gaps are tailored to increase the transmittance between about 900 and 1,100 nm as shown by comparing FIGS. 4 and 8.

One advantage of the subject invention is that a typical hot-mirror filter is characterized principally by its cutoff wavelength. The dielectric design details automatically cause the long wavelength transmittance to be typically 1% or less over nearly the entire long wavelength region. Hot mirrors are also easier and less expensive to manufacture than custom filters such as discussed above with reference to FIGS. 1 and 2. In accordance with the subject invention, the average effective transmittance of the filter array for the hot mirror filter in the 900 to 1,100 nm bin is increased by regions that have no filter material. One method is to etch away small areas of the dielectric layers in a geometrically distributed manner (e.g., small holes or stripes). Another method is to cut the filters into relatively small filters and place them in the simulator with small controlled gaps between the filter pieces. Class A performance is achieved, in one particular example, when the fraction of the filter where the dielectric is removed (or the gaps are introduced) is approximately 1.5%. The new simulator filter can also be designed for a simulator lamp-filter configuration where the filters surround the lamp in a half-hexagon-cross-section or similar geometry as shown in FIG. 6B. The subject invention could also be applied to the more traditional simulator full-filter layout.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents. Many equivalents will be unforeseeable at the time of the amendment and are beyond a fair interpretation of what is to be surrendered (if anything). The rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A solar simulator filter for a source, the filter comprising:
   filter material configured to achieve class A performance for the spectral output of the source except between about 900 and 1,100 nm; and
   openings in the filter material which increase the average effective transmittance between about 900 and 1,100 nm to achieve class A performance for the spectral output of the source.

2. The filter of claim 1 in which the source is a Xe arc lamp.

3. The filter of claim 1 in which the filter material is a hot mirror filter.

4. The filter of claim 3 in which the openings are formed through optically active layers of the hot mirror filter.

5. The filter of claim 3 in which the openings are gaps between a plurality of hot mirror filter pieces.

6. The filter of claim 1 in which the ratio of the total area of the openings and the filter material is approximately 1%.

7. A solar simulator filter for a source, the filter comprising:
   means for achieving class A performance for the spectral output of the source except between about 900 and 1,100 nm; and
   means for increasing the average effective transmittance between about 900 and 1,100 nm to achieve class A performance for the spectral output of the source.

8. The filter of claim 7 in which the means for achieving includes a hot mirror filter.

9. The filter of claim 7 in which the means for increasing includes openings in the hot mirror filter material.

10. A solar simulator comprising:
    a Xe arc lamp;
    hot mirror filter material configured to achieve class A performance for the spectral output of the Xe arc lamp except for between about 900 and 1,100 nm; and
    openings which increase the average effective transmittance between about 900 and 1,100 nm to achieve class A performance for the spectral output of the Xe arc lamp.

11. The filter of claim 10 in which the openings are holes through optically active layers of the hot mirror filter.

12. The filter of claim 10 in which the openings are gaps between a plurality of hot mirror filter pieces.

13. The filter of claim 10 in which the ratio of the total area of the openings and the filter material is approximately 1%.

14. The solar simulator filter for a source, the filter comprising:
    filter material configured to achieve a specified performance for the spectral output of the source except between certain predetermined wavelengths; and
    openings which increase the average effective transmittance between said certain predefined wavelengths to achieve the desired performance requirements for the spectral output of the source.

* * * * *